United States Patent
Reynolds et al.

(10) Patent No.: US 10,222,776 B2
(45) Date of Patent: Mar. 5, 2019

(54) WIZARD FOR CONFIGURING A MOTOR

(71) Applicant: LINESTREAM TECHNOLOGIES, Cleveland, OH (US)

(72) Inventors: Adam Reynolds, Shaker Heights, OH (US); Chris Knaack, Bay Village, OH (US); Boris Eligulashvili, South Euclid, OH (US); David Stopher, Cleveland, OH (US)

(73) Assignee: LINESTREAM TECHNOLOGIES, Cleveland ( * ) Notice: Subject to any disclaimer, the term of this patent is extended or adjusted under 35 U.S.C. 154(b) by 228 days.

(21) Appl. No.: 15/262,219

(22) Filed: Sep. 12, 2016

(65) Prior Publication Data

US 2018/0074472 A1    Mar. 15, 2018

(51) Int. Cl.
*G05B 15/00*    (2006.01)
*G05B 19/042*    (2006.01)
*G05B 19/409*    (2006.01)
*G06F 8/33*    (2018.01)
(Continued)

(52) U.S. Cl.
CPC ....... *G05B 19/0426* (2013.01); *G05B 19/409* (2013.01); *G06F 8/33* (2013.01); *G06F 8/34* (2013.01); *G06F 8/35* (2013.01); *G05B 2219/23043* (2013.01); *G05B 2219/23258* (2013.01); *G05B 2219/34256* (2013.01)

(58) Field of Classification Search
CPC . G06F 3/0482; G06F 8/10; G06F 8/33; G06F 8/35; G06F 17/11; G06F 17/5017; G06F 17/50; G06F 17/5009; G05B 19/0426; G05B 19/406; G05B 2219/23258; G05B 2219/34256

See application file for complete search history.

(56) References Cited

U.S. PATENT DOCUMENTS 5,909,372 A    6/1999    Thybo
7,234,145 B2    6/2007    Wagner
(Continued)

OTHER PUBLICATIONS

International Search Report & Written Opinion for PCT Application Serial No. PCT/US17/49091, dated Nov. 7, 2017, 9 pages.

*Primary Examiner* — Tuan A Vu
(74) *Attorney, Agent, or Firm* — Amin, Turocy & Watson LLP

(57) ABSTRACT

A motor control wizard implements a simple workflow for creating an application-specific program for operation of a motor control system. The wizard prompts for selection of an application area, which sensitizes the system to tune certain motor control parameters in accordance with the demands of the selected application area. The wizard also prompts for selection of a target devices, such as a particular type of motor with a set of basic operating parameters. With the target device and application area known, the wizard runs an automatic adaptation step without requiring additional user-settable parameters. The adaptation step yields an adapted motor control program based characteristics of the motor control system obtained via the adaptation step. The wizard then confirms operation of the motor using the adapted program. Additional features allow the user to fine tune parameters beyond this set of initial configuration parameters.

20 Claims, 13 Drawing Sheets

(51) Int. Cl.
 G06F 8/34 (2018.01)
 G06F 8/35 (2018.01)

(56) References Cited

U.S. PATENT DOCUMENTS

| | | | |
|---|---|---|---|
| 7,324,931 B1 * | 1/2008 | Warlock | G06F 17/50 |
| | | | 703/13 |
| 7,719,219 B2 | 5/2010 | Baumann et al. | |
| 7,917,863 B2 | 3/2011 | Chandhoke et al. | |
| 8,467,888 B2 | 6/2013 | Gahinet et al. | |
| 9,952,837 B1 * | 4/2018 | Maclay | G06F 8/35 |
| 2002/0151993 A1 | 10/2002 | Olesen et al. | |
| 2004/0083456 A1 | 4/2004 | Cornett et al. | |
| 2005/0046375 A1 | 3/2005 | Maslov et al. | |
| 2005/0096894 A1 * | 5/2005 | Szpak | G06F 17/5009 |
| | | | 703/13 |
| 2006/0064183 A1 | 3/2006 | Chandhoke | |
| 2007/0079250 A1 | 4/2007 | Bump et al. | |
| 2011/0295578 A1 * | 12/2011 | Aldrich | G06F 8/10 |
| | | | 703/6 |
| 2012/0084695 A1 * | 4/2012 | Higgins | G06F 8/33 |
| | | | 715/771 |
| 2013/0116987 A1 * | 5/2013 | Zhang | G06F 8/10 |
| | | | 703/2 |
| 2014/0122028 A1 * | 5/2014 | Aberg | G06F 17/50 |
| | | | 703/1 |
| 2015/0048774 A1 | 2/2015 | Iijima et al. | |
| 2017/0147719 A1 * | 5/2017 | Martinez Canedo | G06F 17/11 |
| 2017/0329468 A1 * | 11/2017 | Schon | G06F 3/0482 |

* cited by examiner

FIG. 5
610
620
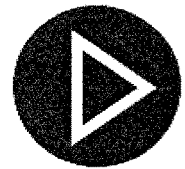
630
FIG. 6

WIZARD FOR CONFIGURING A MOTOR

TECHNICAL FIELD

The present invention relates to programming of industrial controllers and drives for motors.

BACKGROUND

Industrial controllers are often used to control the operation of motors in industrial applications or appliances. In some implementations, the controller may be embodied in a silicon chip, where the silicon chip may be a microcontroller programmed with a set of instructions related to the microcontroller architecture. Industrial drives may also be used to control motors. Such industrial drives may be used to control individual motors, or to control groups of motors. An industrial drive may be programmed with a set of instructions to control the operations of the motor, or motors. These instructions may comprise a low level code that is understood by a microprocessor, or microcontroller, that is used in the system.

A given motor may have a number of parameters that can be controlled and tuned, rendering the process of configuring a motor-driven control application a difficult and complicated task.

The above-described is merely intended to provide an overview of some of the challenges facing conventional motor control configuration systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure related to a wizard that creates an application-specific program to operate a motor control system. The wizard implements a wizard procedure comprising certain steps. The first step is selection of an application area, which sensitizes the system to tune certain parameters to meet the demands of the selected application area. The second step is selection of a motor, including its basic operating parameters. It is possible to reverse the order of the first and second steps in some embodiments. With the motor and application known, the third step is to run an automatic motor adaptation step, which is initiated using a single start button and requires no additional user settable parameters. The motor adaptation step obtains one or more characteristics of the target motor and/or the motion control system (e.g., inertia, friction, resistance, inductances, fluxes, etc.), and updates a motion control program based on the obtained characteristics. The fourth step is to confirm operation of the motor using the updated motion control program. The conformation step is initiated with a single start button, and executes in accordance with a single user-enterable parameter, which is typically a target speed. Upon completion of these steps, the basic motor control program is complete, and the motor is commissioned.

Additional features enable the user to fine tune parameters beyond this set of initial configuration parameters. An optional optimization step can prompt the user to select and alter parameters that are specific to the selected application domain. This optimization step is carried out in a simple click-to-edit environment that does not require detailed knowledge of the motion system or its specific code base. In an additional screen or area of the wizard, advanced users may also select and update all configuration parameters, including parameters that are not specific to a particular application area. These additional configuration parameters are optionally organized in functional groups that relate to particular aspects of the motor control system. This enables the wizard to extend features to advanced users who may know the motor or operating environment in more detail relative to an inexperienced user, so that a separate program is not required for advanced users.

The guided and intuitive workflow implemented by the wizard allows a user having limited familiarity with a particular motor and its control hardware to run the motor and to create an application-specific program to operate the motor by following a simple wizard procedure comprising steps that are easy to follow. Additional features enable the user to fine tune parameters beyond this set of initial configuration parameters.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

BRIEF DESCRIPTION OF THE DRAWINGS

FIG. 5 is an exemplary nameplate for a motor.

FIG. 6 are exemplary icons that may be rendered by the wizard in connection with programming the motor control system.

DETAILED DESCRIPTION

Figure 1:
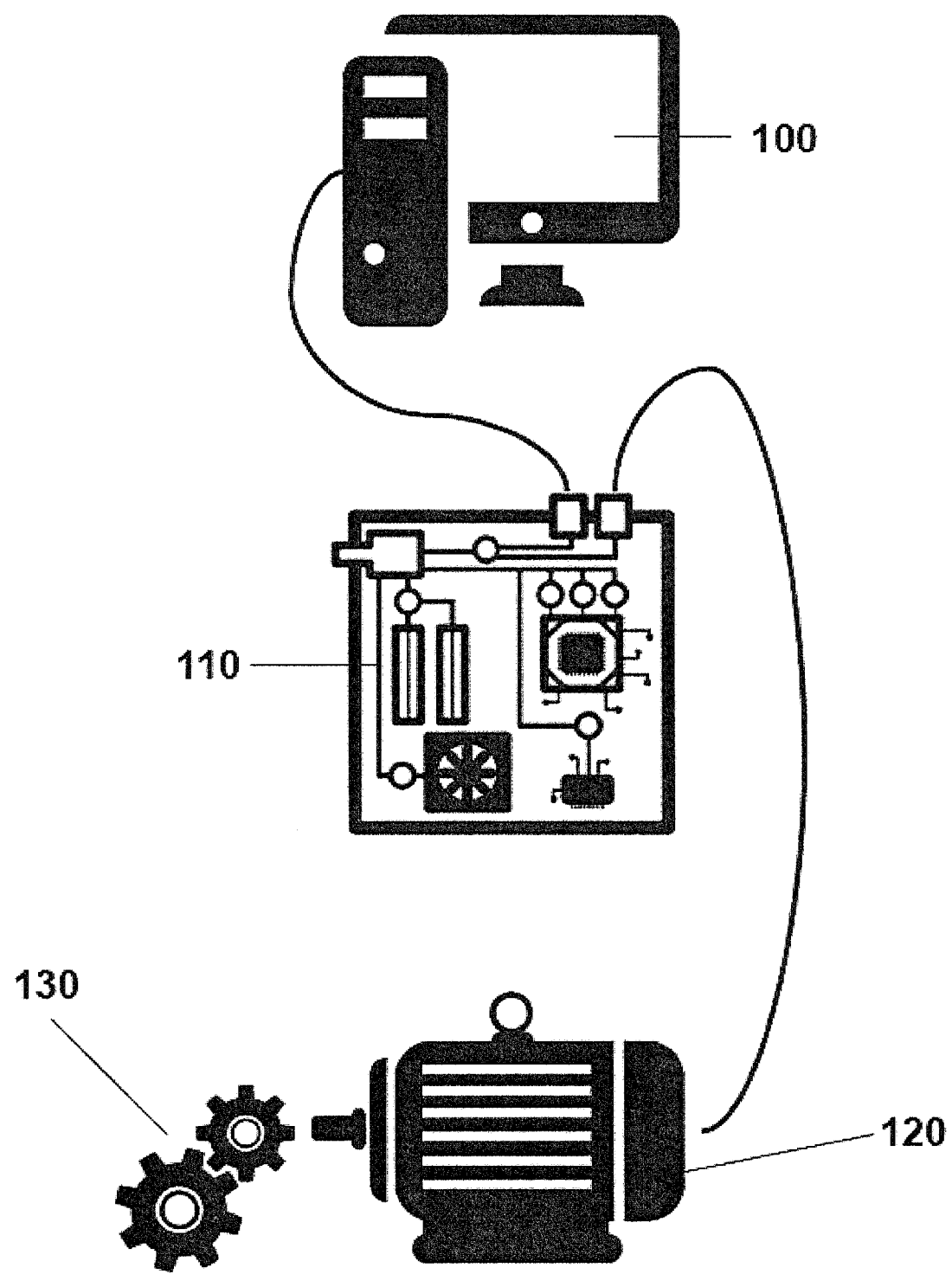
FIG. 1 is a block diagram of a motor control system and computer apparatus for programming the motor control system.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

As noted above, a given motor may have a number of parameters that can be controlled and tuned. In some applications, one or more parameters of a motor-driven system control may be controlled using a feedback control algorithm. A number of different types of feedback control algorithms are available, including proportional-integral-derivative (PID) control algorithms. A PID controller uses three parameters as part of its tuning algorithm—the proportional (P), the integral (I), and the derivative (D) values. The P value is related to the current error in the system. The I value (as an integral or accumulation of past errors) is related to past error. The D value (as the derivative or rate of change of error) is related to future error. Significant time and energy are spent by control engineers to "tune" these three parameters across operating conditions, both algorithmically and manually, in real-world instances of motor-driven system control. In many applications, the output signal generated by the feedback algorithm is used to control the speed of the motor, and the feedback signal provided to the algorithm represents a measured actual speed of the motor. However, certain applications may use pressure as a defining control loop, such that the system outputs a speed control signal but does not use speed for feedback. The commissioning of such systems can be achieved equivalently.

Alternative methods for feedback control have been developed. One such method is disturbance rejection control (DRC) and its subset, advanced disturbance rejection control (ADRC). Disturbance rejection control and active disturbance rejection control differ from PID control by introducing an extended state observer (ESO). The ESO is incorporated in the control feedback loop to decouple the plant, or target, of motor-driven system control, from the disturbances acting upon the plant. In some instances, (A)DRC may have ten or more tunable parameters, making it more complex to implement than PID control. A preferred form of (A)DRC is parameterized ADRC, which frequently simplifies tuning relative to a comparable PID controller. In some instances, tuning a parameterized ADRC system can be reduced to tuning a single parameter—typically bandwidth—while achieving process control results similar to, if not exceeding, a comparable PID controller across operating conditions.

Even with feedback control methods, such as (A)DRC, that require fewer tuning parameters, setting up a motor for use within a particular motion control application is still a complex process. To simplify the process of configuring a motor control system for a given motor-driven application, wizards can be used to set up motor control programs. A wizard is a sequential on-screen dialog that guides a user through a configuration process, including but not limited to initialization processes. Because wizards typically execute on a computing device that includes a display and an input device, such wizards can facilitate fast and user-friendly programming of an industrial device, such as a motor, that may not have a user interface. A drive system may include a user interface, so it is possible to execute a wizard through the user interface of a drive system, or an external computing device in communication with the drive system.

Current wizards for motor control systems suffer from at least two challenges. First, there is still a great deal of complexity involved in setting up motor control programs using most wizards. In particular, such wizards include multiple screens with multiple input parameters on each screen, which may confuse an application developer who is more familiar with his or her application requirements than with the subtleties of a particular motor. In general, a better wizard is needed that balances the simplicity of a wizard format with the recognition that configuring a motor may require setting of a number of parameters to work effectively in a particular application environment. The wizard needs to better leverage knowledge about the application context.

A second concern is that existing wizards do not permit the fine tuning of a motor control program in an effective way. There is sometimes no ability to fine tune a motor control program using a wizard. Other wizards suffer from having too many parameters to fine tune, or require low-level knowledge of the motor or the microprocessor or microcontroller that operates the motor. What is needed is the ability to use the wizard environment and a simple click-to-edit procedure to fine tune selected elements of the motor control program for a particular application environment.

To address these and other issues, one or more embodiments described herein provide an improved wizard for creation of an application-specific program used to operate a motor control system. The wizard implements a simple wizard procedure comprising certain steps. The first step prompts the user to select an application area, which sensitizes the system to tune certain parameters to meet the demands of the selected application area. The second step prompts the user to select a motor, which may include prompting the user to specify the motor's basic operating parameters. The order of the first and second steps may be reversed in some embodiments. With the motor and application known, the wizard triggers an automatic motor adaptation step as a third step in response to selection of a single start button, with no additional user settable parameters required. The fourth step, initiated by a single start button, confirms operation of the motor with a single user-enterable parameter, which is typically a target speed. At this point, the basic motor control program is complete, and the motor is commissioned. As will be described in more detail below, additional features enable the user to fine tune parameters beyond this set of initial configuration parameters.

FIG. 1 is a block diagram of a motor control system and computer apparatus for programming the motor control system. Computer 100 may be a general purpose computer or application-specific computer used to implement the invention. A general purpose computer may be, for example, a laptop personal computer, a work station, or a server computer. It is also possible to implement this invention with a tablet computing device, a smart phone, or other mobile personal computing device. In one or more embodiments, an application-specific computer may be a drive system for use in a motor control system. Computer 100 can include an input device that allows a user to communicate with the system, and an output device (typically a visual monitor) that renders output data to the user.

Controller 110 is used to drive a motor control system. Controller 110 may be a standalone device, or may be integrated with other elements of the system. In one or more embodiments, controller 110 can be a standalone and packaged device, which is typically referred to as a drive. In other embodiments, controller 110 can be integrated with motion device 120, where motion device 120 includes embedded drive electronics. FIG. 1 illustrates a first communicative connection between controller 110 and computer 100, and second communicative connection between controller 110 and motion device 120. These communicative connections may comprise physical connections including wires, cables, optical or electronic interlinks, and/or shared printed circuit board elements. In an embodiment, connections between one or more of the devices may also be wireless, using one of many protocols. Example protocols include, but are not limited to, general purpose wireless protocols such as Bluetooth and WiFi, as well as industrial protocols such as (wireless or wired) HART, Zigbee, and the like. Proprietary buses and wireless links can also be used to provide greater security or performance.

Motion device 120 is a device configured to perform an actuation in accordance with an electronic signal. Motion device 120 can have at least two states. In a first state, motion device 120 is unloaded, such that the only load seen by the motion device is its internal inertia. In a second state, motion device 120 is connected to a mechanical load 130, which impacts the performance of motion device 120. As a result, controller 110 incorporates one or more feedback control algorithms so that the performance of motion device 120 is relatively uniform and predictable between its loaded and unloaded states. Example feedback control algorithms can include PID and (A)DRC algorithms. Motion device 120 is assumed to be a motor in the examples described herein. The description specifically discusses the invention in the context of an alternating current (AC), three-phase induction motor. However, the invention may be applied to other types of motors and even other types of motion devices. Load 130, as described through additional examples herein, is associated with an application area, or functional domain. For example, load 130 may be the propulsion system in an electric vehicle (or more broadly, the vehicle), wherein controller 110 directs motion device 120 (a motor in this case) to start, stop, and regulate the motion of the vehicle. In programming, load 130 may be simulated. During normal operation during which controller directs operation of load 130, computer 100 may be removed from the system.

Figure 2:
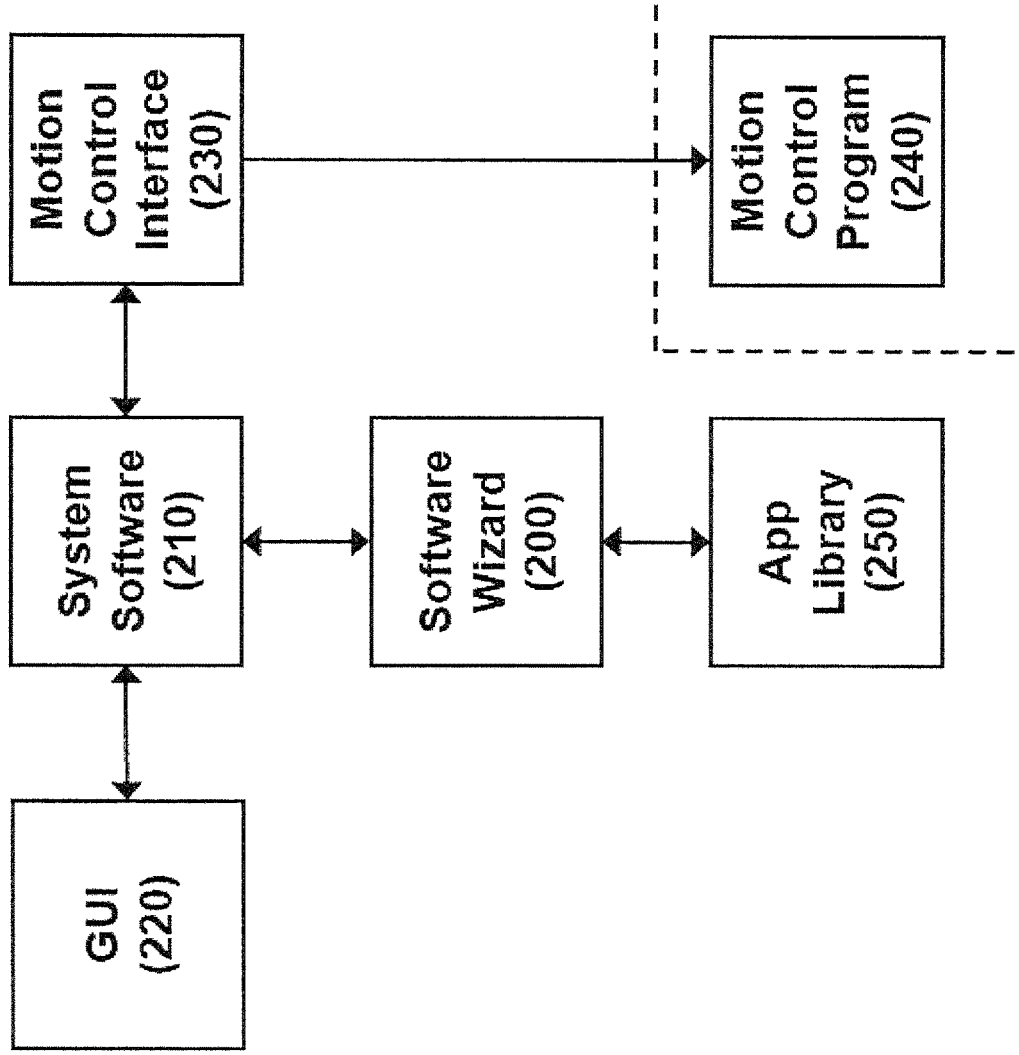
FIG. 2 is a block diagram of software blocks that comprise a wizard for programming the motor control system.

FIG. 2 is a block diagram of software blocks that comprise a wizard for programming a motor control system. In some embodiments, the blocks depicted in FIG. 2 can comprise software instructions stored on a memory (e.g., a memory of computer 100) and executed by one or more processors (e.g., a processor of computer 100). Components of the wizard may also interact with other hardware and/or software components not depicted in FIG. 2. For example, one or more of the software blocks depicted in FIG. 2 may interact with one or more external user interface devices, such as a keyboard, a mouse, a display monitor, a touchscreen, or other such interface devices.

Software wizard 200 forms the core of the system, and is used to integrate and direct the other modules. Any number of computer programming languages may be used to develop the source code comprising software wizard 200. Python and C# are examples of computer programming languages that can be used to implement one or more functions of the wizard described herein. System software 210 is an environment that is supported on computer 100 (e.g., Linux, Microsoft Windows, Android, iOS, or other such computer operating environments). Through protocols known in system software 210, software wizard 200 communicates with other components. A graphical user interface, or GUI 220, is used to communicate with an external user, accepting his or her input as well as displaying visual and/or audio information to the user. A motion control interface 230 resides between software wizard 200 and system software 210 on the one hand and motion device 120 (not shown) on the other. Motion control interface 230 enables the transfer of a motor control program 240 to controller 110 or motion device 120 to carry out its execution. During control of load 130, only motor control program 240 is required, as illustrated by the dotted lines. In addition, application library 250 may be in communication with software wizard 200, either directly or through system software 210, to provide a number of application prototypes, or profiles, that are useful for a particular motor control device and application context, as more fully described below.

Figure 3:
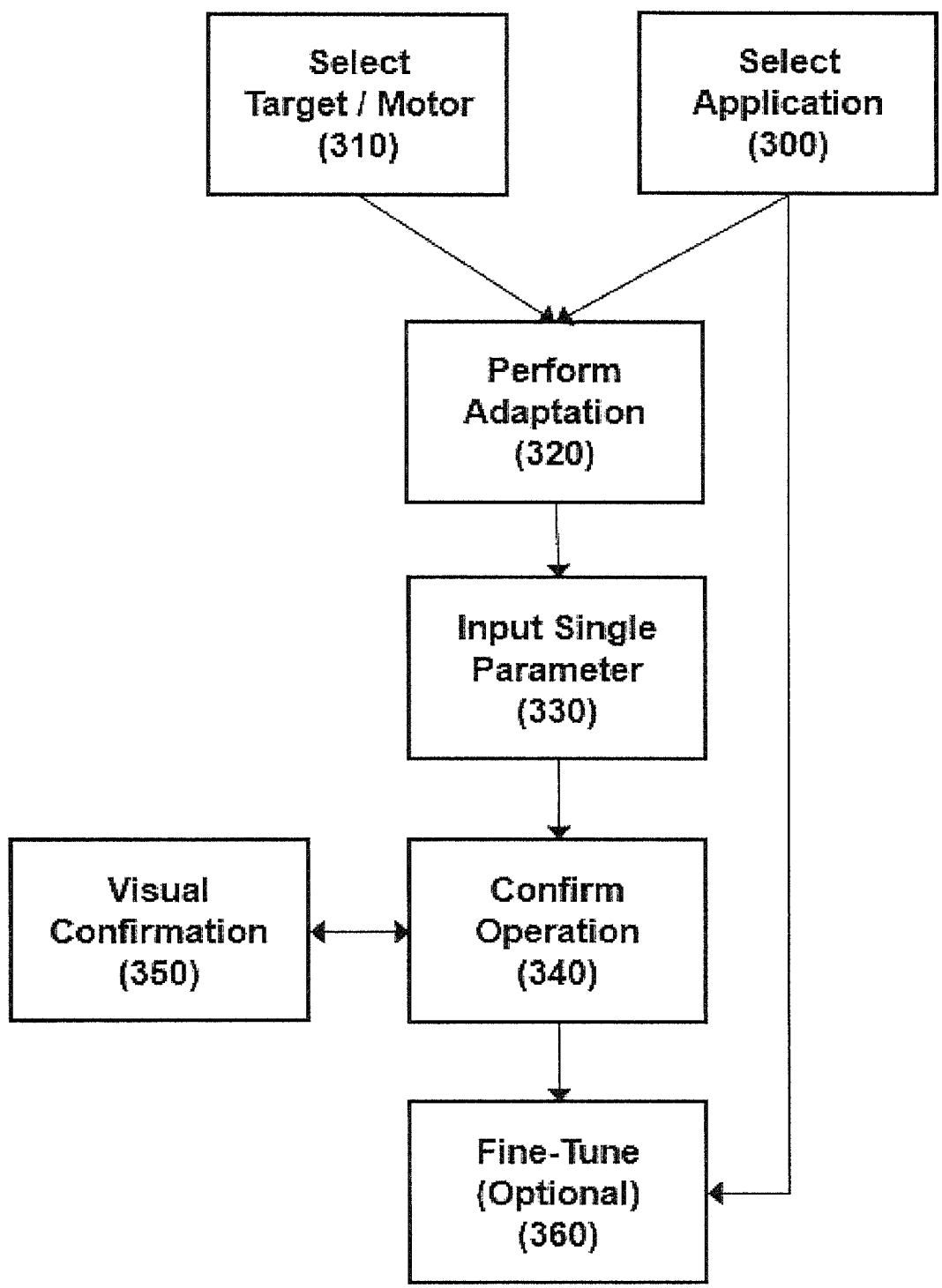
FIG. 3 is a flow chart of an example methodology implemented by a multi-step wizard for creating an application-specific program to operate a motor control system.

FIG. 3 is a block diagram of a flow chart of an example methodology carried out by the multi-step wizard to create an application-specific program for operation of a motor control system. In step 300, an application domain is selected, typically via interaction with the wizard's GUI 220 by a user. The application domain may be selected from two or more potential application domains presented to the user via the GUI 220. In a first aspect, an application domain may define a field of practice or industry in which the motion control system will be operating. Exemplary fields of practice can correspond to types of equipment or systems to be controlled by the application-specific program, including but not limited to cranes, conveyors, heating ventilation and air conditioning (HVAC) systems, marine systems, wastewater systems, and appliance systems (e.g., spin dryers, centrifuges, etc.). Another aspect of an application domain may define a form of motor control within the selected field of practice. For example, if a control program is to be developed for a crane application (the field of practice), motor control profiles may be required to pivot a base of a crane, adjust the tilt of the crane arm, or control the intake of a coil winch. Selection of the field of practice can convey to the wizard which types of motion control profiles will be required for the application being developed. Other potential types of motion profiles can include, but are not limited to, belt drives (conveyor), fans and blowers (HVAC), propellers (marine), and pump and valve control (wastewater). Motion profiles not illustrated in the exemplary figures of this disclosure are also possible, including but not limited to drive motors (electric vehicles), linear motors (medical devices), stepper motors (disk drives), and various types of motion devices used in aerospace, robotics, and other application domains.

In step 310, a target to be controlled in the motor control system is selected, typically via interaction with the GUI 220 by the user. An example target may be a motor, such as an alternating current (AC), three-phase induction motor. However, it is to be understood that the invention may be applied to other types of motors and even other types of motion devices. It is also possible to invert step 300 and step 310, and select the target of the motor control system prior to selecting an application domain. Upon selection of a motor control system and an application domain, the wizard can retrieve a sample motor control program that is appropriate to the context defined by the motion control system and application domain. In some embodiments, the wizard includes an application library 250 that hosts a number of sample motor control programs or profiles, one of which may be retrieved based on the selected motor control system and application domain. In some embodiments, the wizard may synthesize the sample motor control program at runtime using library components related to the indicated target of the motor control system and application domain. These libraries and object models may be built over time based on instances of successful applications used in the past, using knowledge of persons with deep domain expertise. Machine learning methods and other techniques may also be used to improve these libraries and object models. At the conclusion of step 310, an initial sample motor control program is retrieved or created.

In step 320, and using the initial sample motor control program, the system performs an automatic adaptation step for the motor control system. The automatic adaptation step is designed to identify one or more characteristics of the motion control system in order to appropriately adapt the selected sample motor control program for use by that particular motion control system. The automatic adaptation step is typically initiated upon receipt of a start command from the user, received via interaction with GUI 220. Significantly, and in contrast to other systems for programming a motor control system, the automatic adaption step does not require additional parameters to be set by the user. Rather, the automatic adaptation step is performed solely using information about the application domain and the basic information identifying the target of the motor control system. In an example automatic adaptation step for a three-phase AC induction motor, a sequence may be executed that is designed to identify the resistances, inductances, and fluxes representative of the motor. This sequence may be carried out by the wizard by sending appropriate signals to the controller 110 designed to transition the motor through the sequence, to measure values of one or more parameters during execution of the sequence (e.g., speeds, accelerations, etc.), and to determine the motion control characteristics based on the measured values. Some or all of the adaptation sequence may be performed using the sample motor control program retrieved from the application library 250 based on the selected target and application area. In another example automatic adaptation step, a sequence may be executed to identify inertia and friction in the system.

The wizard will adapt the sample motion control program based on measurements and faults received during such commissioning, where the adaptation may include modifying the drive settings for the motor in the motor control program. For example, if the motor is found to be low inductance based on results of the adaptation step, the wizard may change the pulse width modulation (PWM) frequency used to control the motor from its original default value (defined in the pre-adapted version of the sample motor control program). In another example, if the motor is found to have a high inertia value, the speed controller gain for control will be changed from its original default value. Adaptations such as these, implemented as a result of the automated adaptation performed at step 320, yields an adapted motor control program.

Using the adapted motor control program, a single user-definable parameter is received in step 330. In step 340 and using the single user-definable parameter received at step 330, a confirmatory operation step is performed to confirm operation of the target to be controlled in the motor control system. Step 340 may be launched upon receipt of a second start command from the user via GUI 220. The start command may also be a confirmatory enter, tab, mouse click, key press, or the like received when inputting the single parameter in step 330. For an exemplary three-phase AC induction motor, a parameter provided for the confirmatory step may be a target speed for the motor, entered in revolutions per minute. The confirmation operation may involve, for example, sending the adapted motion control program to the controller 110 using motion control interface 230, and running the motor based on the adapted program and in accordance with the parameter (e.g., a target speed) entered by the user via the wizard. During execution of the confirmation operation, a measured feedback speed may be shown to the user graphically via GUI 220 to confirm that the motor runs up to the selected target speed. To facilitate visual confirmation in step 350, the wizard may display a simple numeric output that shows an instantaneous measured feedback speed. In alternative embodiments, the wizard may generate and display a real-time graph showing feedback speed over time. In step 360, as discussed in more detail below in the example of FIG. 4F, the adapted sample program may be fine-tuned for additional performance enhancement.

Figure 4A:
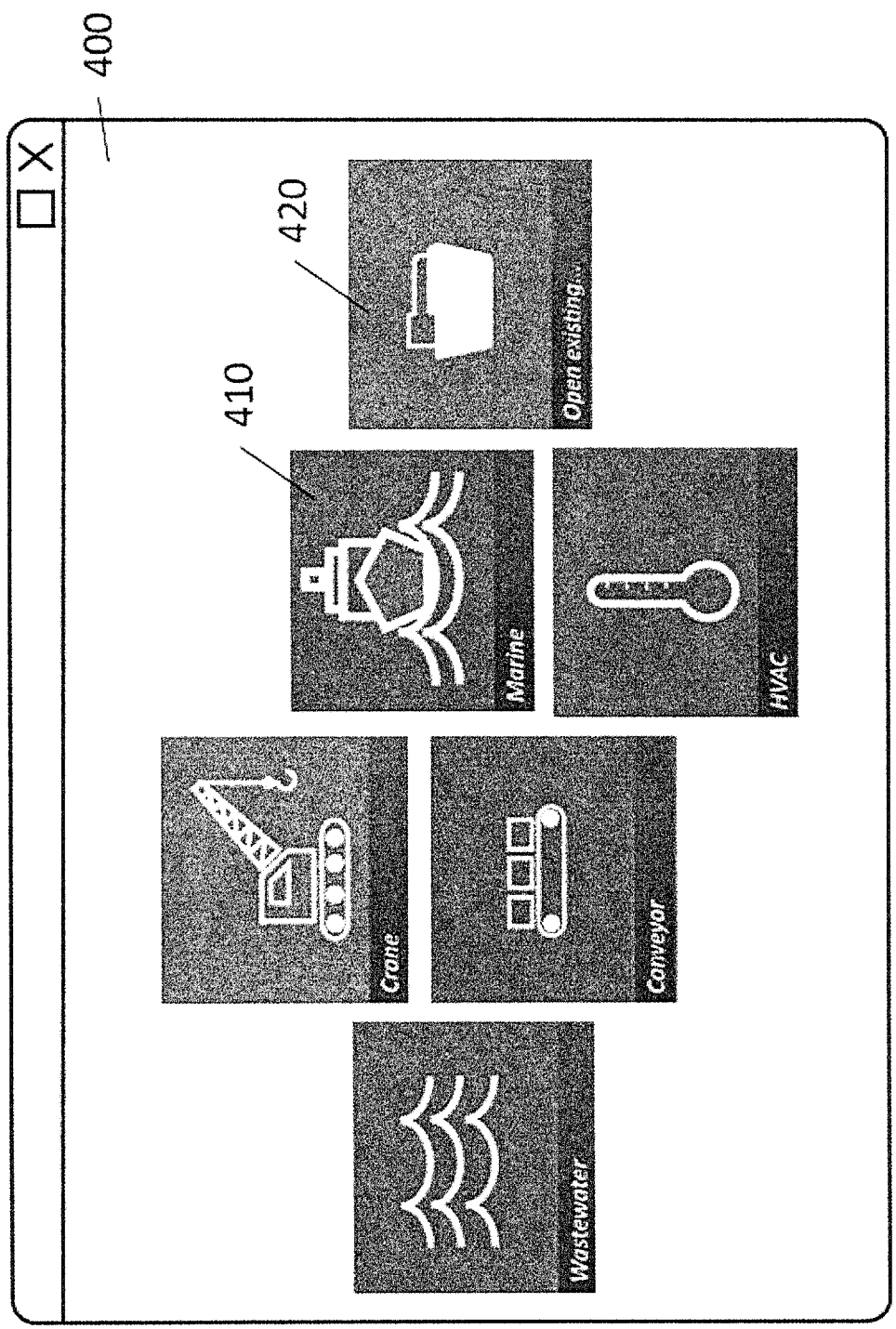
FIGS. 4A-4F are exemplary graphical interfaces associated with steps carried out by the wizard to create an application-specific program to operate a motor control system.

FIGS. 4A-4F are exemplary screen shots that can be rendered via GUI 220 in connection with the steps described above for creating an application-specific program to operate a motor control system. FIG. 4A shows an example home screen for the wizard. Window 400 can be rendered in a typical display window used in the context of computer systems. The interface of computer system 100 may be used for the control of motion device 120 through controller 110. The GUI module 220 operates to generate the contents of window 400 and the other exemplary screen shots of FIGS. 4A-4F. In FIG. 4A, tile 410 represents one illustrative application area that may be selected by a user; namely, the marine application area. Other application areas shown in separate tiles can include crane, conveyor, HVAC, and wastewater application areas. Tile 420 provides an entry point to open an existing application. Tile 420 may launch another series of tiles, or open a new window in which a file selection list is rendered through the operating system. It is assumed in the present example that the user selects tile 410, which may occur through a point-and-click scheme, tab-and-select scheme, or user touch interface. The marine application area is then selected as part of step 300 as the application.

Figure 4B:
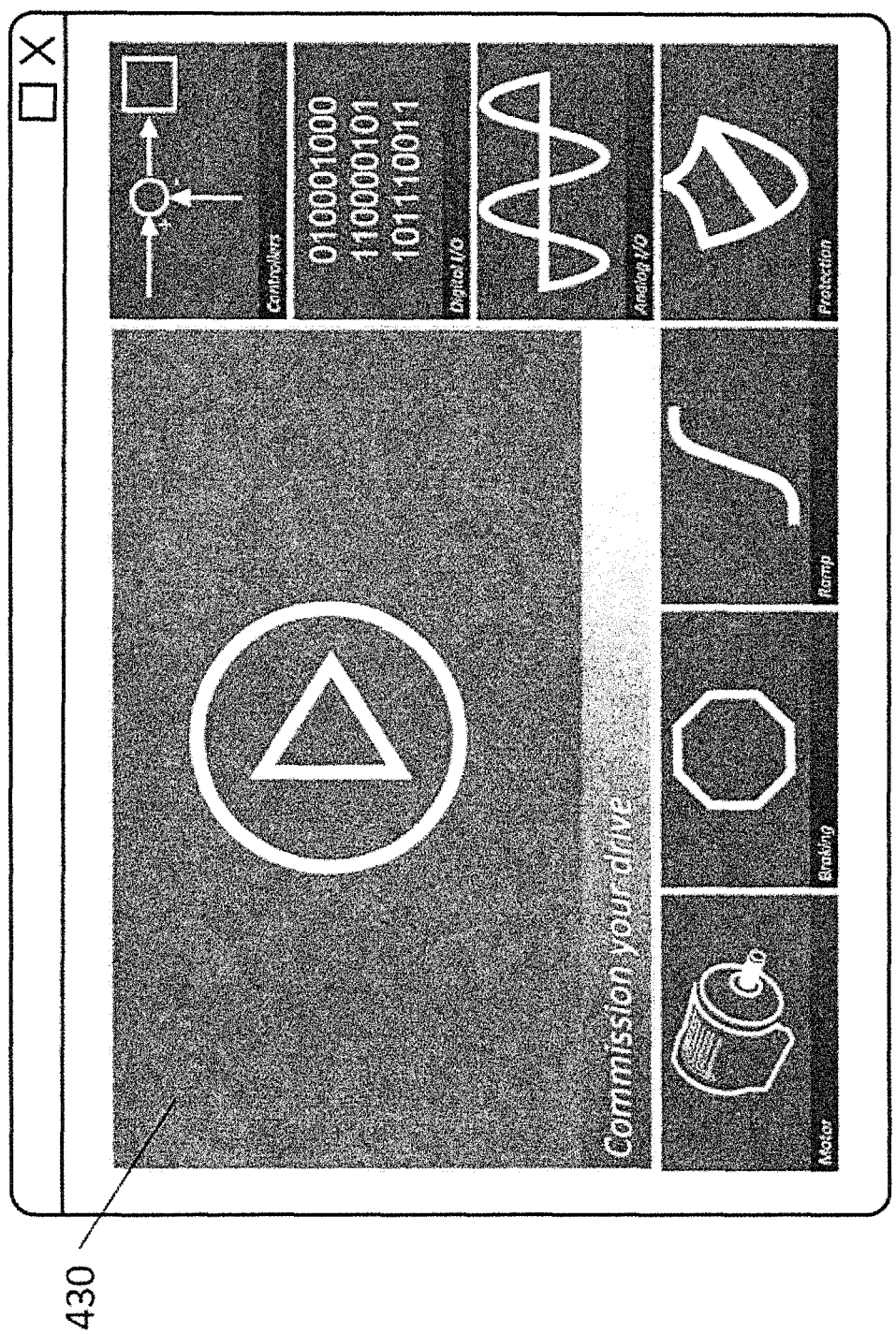

FIG. 4B shows an example application-level home screen that can be rendered by GUI 220. This screen is optional. The majority of the application-level home screen consists of a "commission your drive" tile 430, which causes the wizard to proceed to the next step. Tile 430 can be rendered in a larger size relative to other tiles on the window in order to draw inexperience users to the tile in order to continue with the steps of the wizard. The other seven exemplary tiles shown in FIG. 4B enable an advanced user to fine-tune an application-specific program. More or fewer tiles can be rendered for the advanced user in various embodiments. In some embodiments, the "commission your drive" tile 430 can be distinguished from the advanced tiles through color or shape, in addition to, or as an alternative to, its larger size. Also, in some embodiments, the screen depicted in FIG. 4B can be omitted, and the wizard can navigate directly from FIG. 4A to FIG. 4C. It is assumed in the present example that the user selects tile 430, which may occur through a point-and-click scheme, tab-and-select scheme, or user touch interface.

Figure 4C:
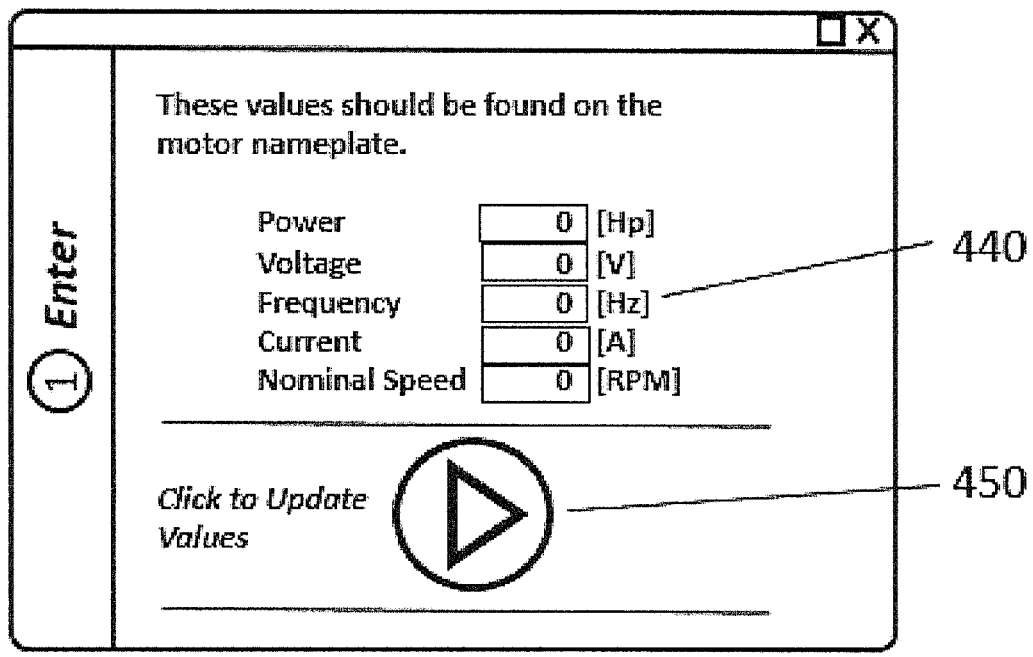

FIG. 4C shows a selection screen for a motor control system. In this example, a three-phase AC induction motor is assumed and five motor parameters are inputs 440. In the example, the five motor parameters for input 440 are its power (in horsepower), rated voltage (in volts), operating frequency (in hertz), current draw (in amperes), and nominal speed (in revolutions per minute). These parameters may be derived from a specification sheet or quite frequently, from the motor label or nameplate. FIG. 5 is an exemplary motor nameplate, which includes information for power 500 (30.0 horsepower), rated voltage 510 (460 volts), operating frequency 520 (60 hertz), current draw 530 (35.0 amperes), and nominal speed 540 (1,765 revolutions per minute). These numbers may be transcribed, or keyed in, by the user into the five motor parameters for input 440. It is also possible to organize FIG. 4C as a series of tiles similar to FIG. 4A, or as a drop down list of particular motors, or particular parameters. The drop-down lists may be limited to a subset based on previous selections. In yet another embodiment, the five motor parameters for input 440 may be captured through a camera interface or a wireless interface. Through the screen in FIG. 4C or an equivalent, the target of the motor control system is selected as part of step 310. With both application domain and target defined, an activation button 450 may then be used to continue the wizard.

Figure 4D:
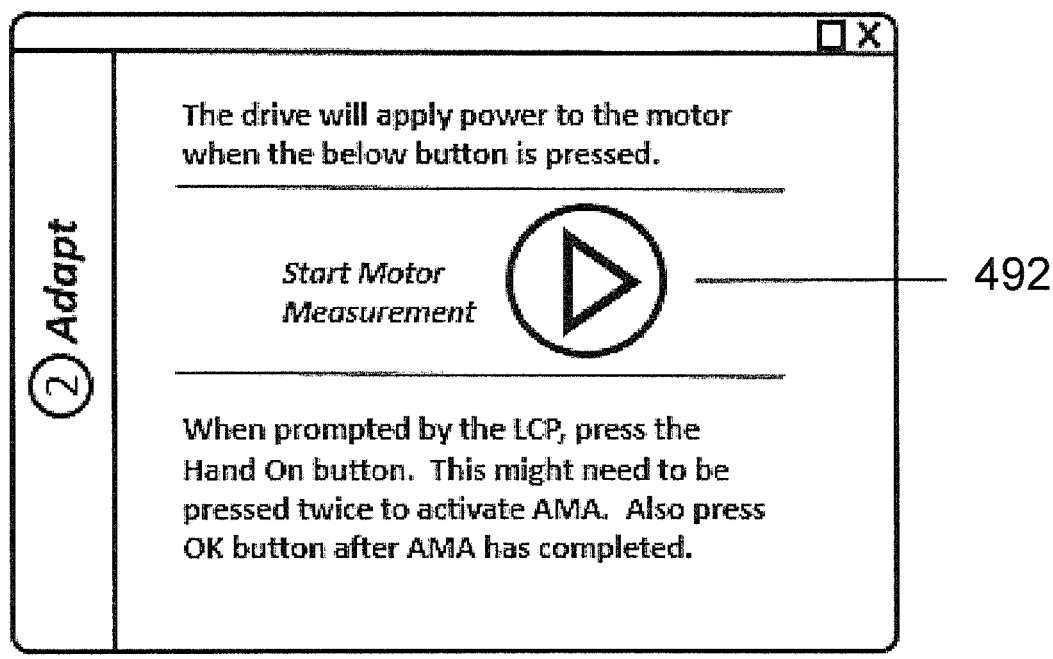

FIG. 4D depicts a screen that can be generated by GUI 220 to commence the automatic adaptation process. Significantly, and in contrast to other systems for programming a motor control system, the automatic adaption step does not require the user to set any additional parameters. Instead, an activation button 492 may be used to start the automatic adaptation process, which is described in step 320. The automatic adaptation process is performed solely using information about the application domain specified by the selection made via the screen depicted in FIG. 4A and the basic information identifying the target of the motor control system specified by the inputs entered via the screen depicted in FIG. 4C.

Figure 4E:
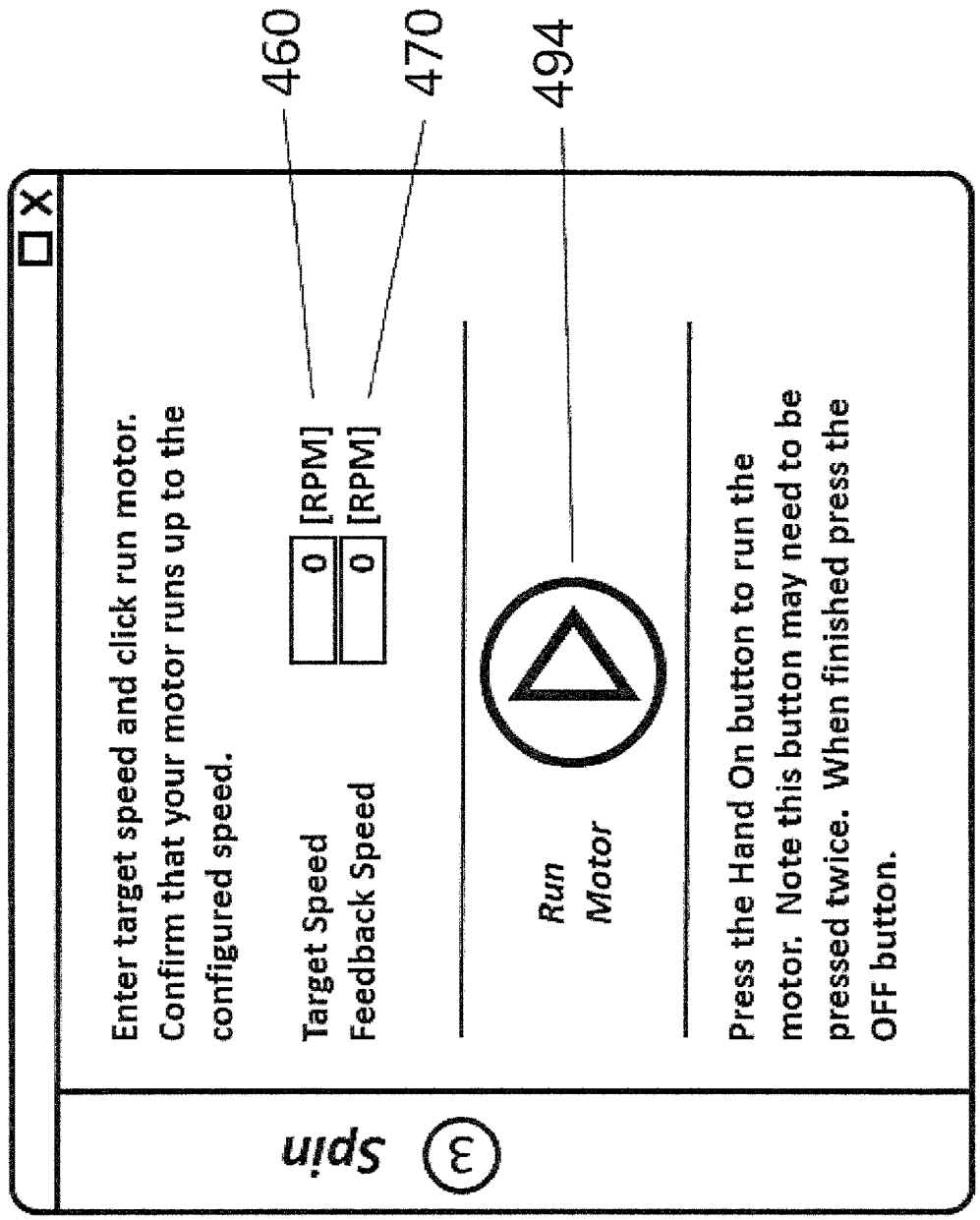

FIG. 4E shows a screen that can be generated by GUI 220 to confirm operation of the target to be controlled in the motor control system. For an exemplary three-phase AC induction motor, one of the parameters provided for the confirmatory step may be a target speed 460 for the motor, entered in in revolutions per minute. The confirmation step can be initiated by selecting an activation button 494 rendered on this screen. Selection of the activation button 494 can cause the wizard executing on computer 100 to instruct controller 110 to cause the motor to spin in accordance with the specified target speed 460, as provided in step 340, in order to confirm operation. The actual speed of the motor can be read from the controller 110 by the wizard and rendered to the user to visually conform the speed of the motor during this step (step 350). In some embodiments, the wizard may display simple numeric output representing the measured instantaneous feedback speed 470 on the screen. In alternative embodiments, the wizard may generate and display a real-time graph by the wizard, where the graph shows feedback speed over time.

Figure 7A:
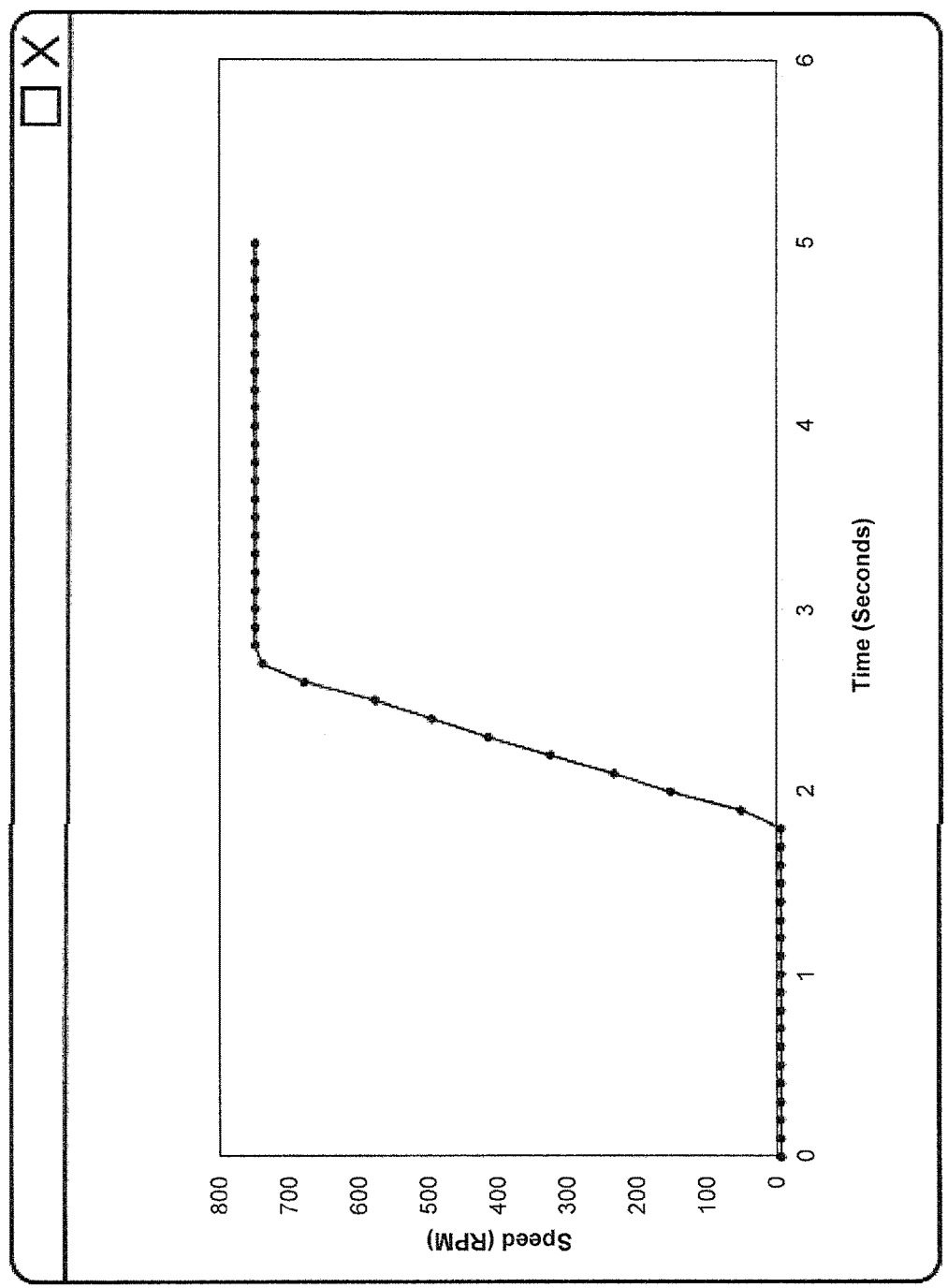
FIGS. 7A-7B are exemplary graphical interfaces for an optional module of the multi-step wizard that provides a real-time plot of the motor control system in operation during setup.
Figure 7B:
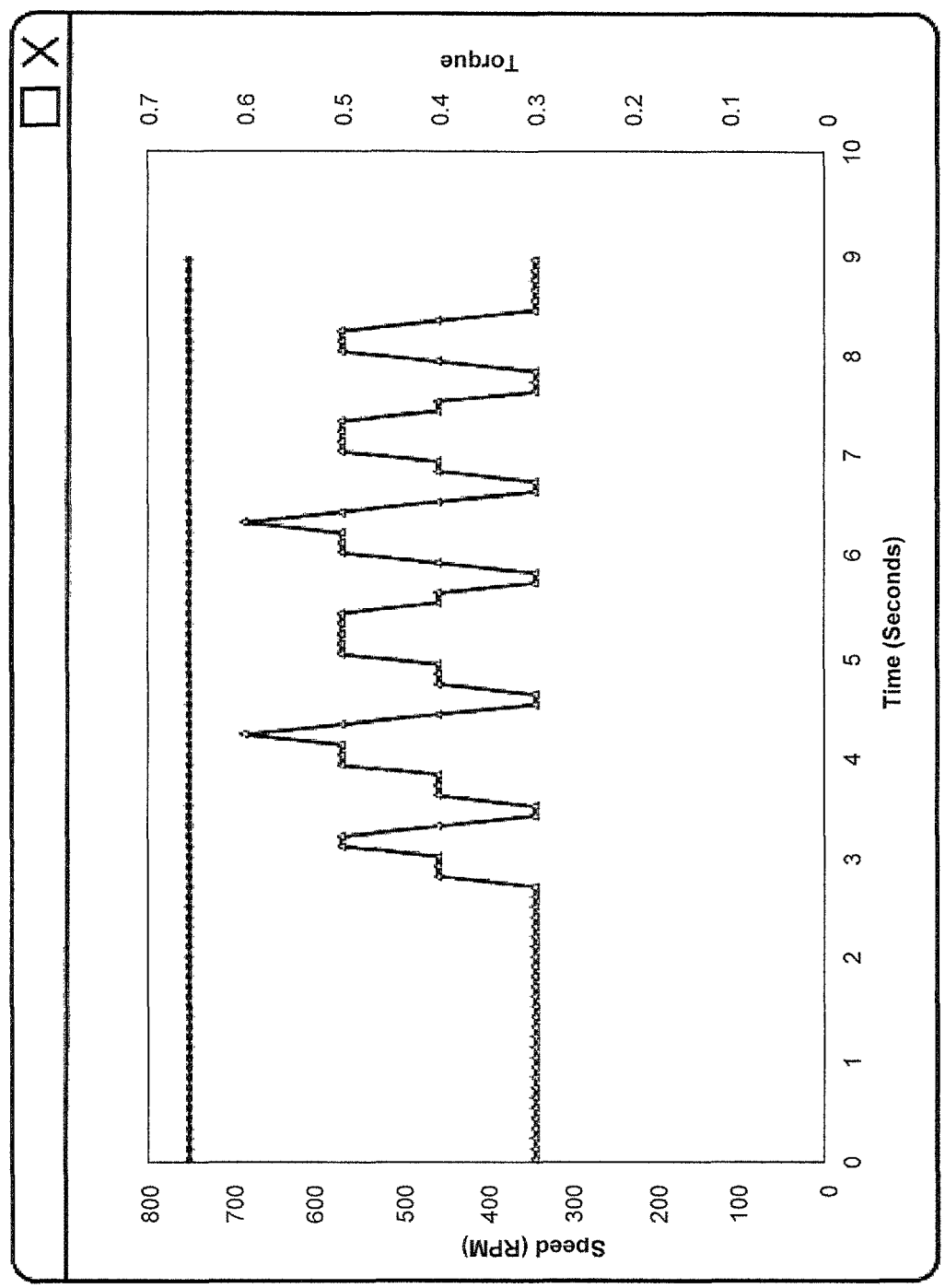

FIGS. 7A-7B are example screen shots that can be generated by GUI 220 in connection with an optional module of the multi-step wizard to provide a real-time plot of feedback over time. FIG. 7A is a graph plotting the speed of an example three-phase AC induction motor over a running time of 5.0 seconds. The x-axis represents time in seconds. The y-axis represents the rotation of the motor in revolutions per minute (RPM). In this example, the sampling rate is 10 times per second, yielding 50 total data captures. The motor is shown during a start-up phase in which the motor is launched from standstill to a steady state of 750 RPM, taking approximately one second to reach this steady state. The line on the graph with samples shown by filled circles plots the measured feedback speed of the motor. The reference speed may also be shown in the graph in a separate line with separate markers. In FIG. 7A, measured speed and reference speed are identical, so the reference speed is visually obscured.

FIG. 7B is a graph plotting the speed of a similar motor that has been running for 9.0 seconds in a steady state mode of 750 RPM with a variable load applied during that period. The x-axis represents time in seconds. The primary y-axis represents rotation of the motor in RPM. The secondary y-axis represents torque on the motor. Torque may be shown in relative terms such as a percentage or ratio of rated capacity. Torque may alternatively be shown in absolute terms such as Newton-meters or pound-feet. Again, the sampling rate is 10 times per second, yielding 90 total data captures. The line on the graph with samples shown by filled circles plots measured feedback speed of the motor, corresponding to the primary y-axis. The line on the graph with samples shown by open triangles plots measured torque of the motor, corresponding to the secondary y-axis. In the illustrated example, six disturbances or variable loads are applied, at a rate of approximately one disturbance per second from the 3 to 8 second marks. The measured rotation rate stays constant at 750 RPM. As in the prior figure, measured speed and reference speed are identical, so any indication of reference speed is visually obscured.

Figure 4F:
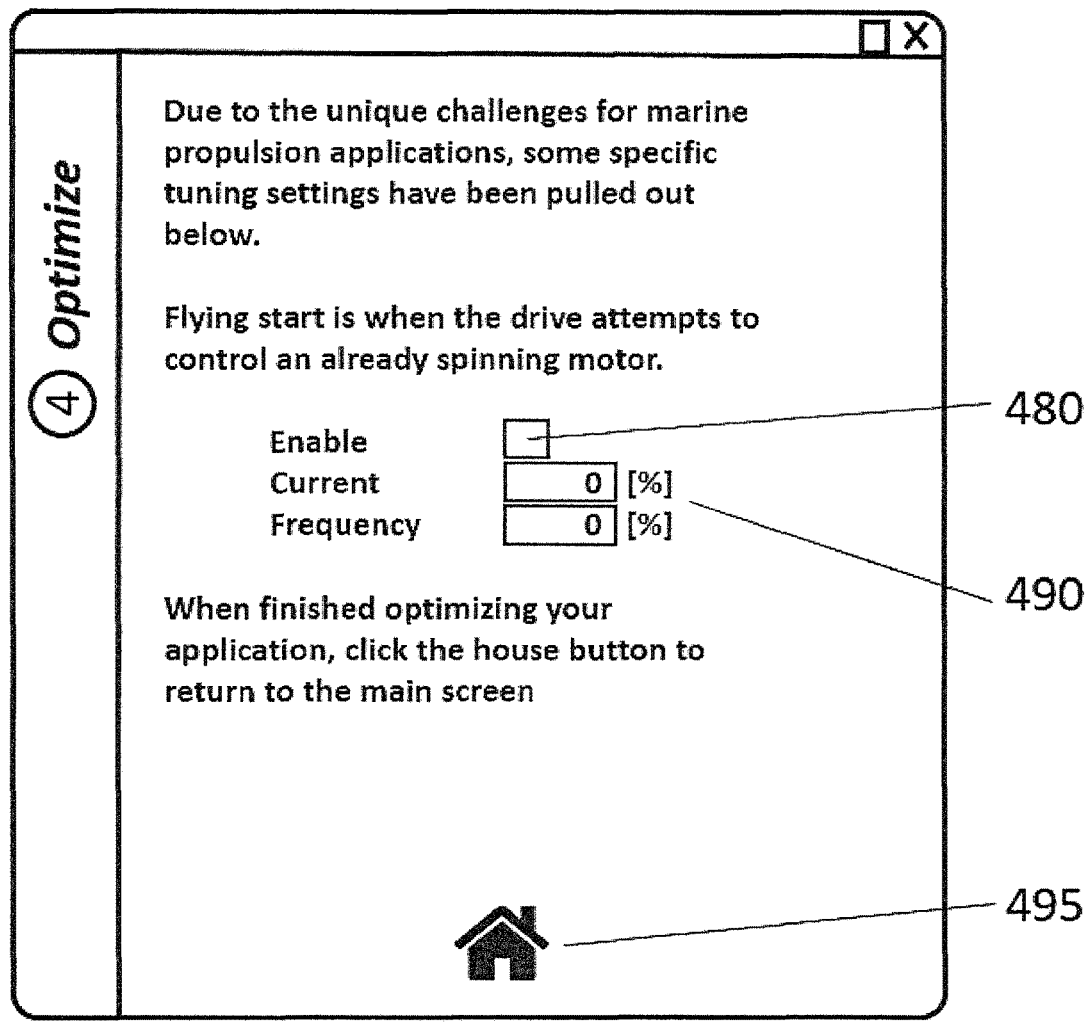

FIG. 4F shows an example screen that can be generated by GUI 220 for optimization of the motor control system. This screen is optional. In the illustrated example, a marine system and a particular motor are selected, respectively, using the display screens of FIG. 4A (in association with step 300) and FIG. 4C (in association with step 310). It is known that motors experience unique challenges in marine propulsion applications, which may dictate that certain motor control parameters should be set to be within certain preferred ranges in order to yield acceptable or substantially optimized performance in such applications. Accordingly, based on selection of the marine application using the screen of FIG. 4A, the wizard can render a subset of total system parameters that are particularly relevant to the marine application on the screen depicted in FIG. 4F. For example, flying start is a condition wherein a drive attempts to control an already spinning motor. Accordingly, if the user has selected Marine as the application area, the wizard can render a check-box 480 that allows a user to fine-tune the motor control application by enabling (with a check) or disabling (without a check) flying start for the motor control application. In addition, boxes 490 allow fine-tune input to be entered for current and frequency, represented as a percentage of the rated numbers. Selection of a home icon 495 causes the wizard to further update the motor control program with the fine-tune parameters for additional performance enhancement (after the initial adaptation of the selected sample motor control program performed at step 320), per step 360 of the wizard method. Although home icon 495 is illustrated as a mechanism to complete FIG. 4F, other icons and procedures may be used. FIG. 6 shows three exemplary icons that may be used in the wizard for programming the motor control system. Icon 610 is the home icon. Icon 620 is a chart icon that may be used to launch the detailed charts as shown in FIG. 7. Icon 630 is one form of activation button that is used in several of the exemplary figures.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the wizard described herein can be implemented in any computer system or environment having any number of memory or storage units (e.g., the memories of computer 100), and any number of applications and processes occurring across any number of storage units. This includes, but is not limited to, an environment with server computers and client computers deployed in a network environment or a distributed computing environment, having remote or local storage. For example, with reference to FIG. 2, the software wizard 220 and associated GUI 220, software system 210, motion control interface 230, app library 250, and motion control program 240 can be stored on a single memory associated with a single device, or can be distributed among multiple memories associated with respective multiple devices. Similarly, these components can be executed by a single processor, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
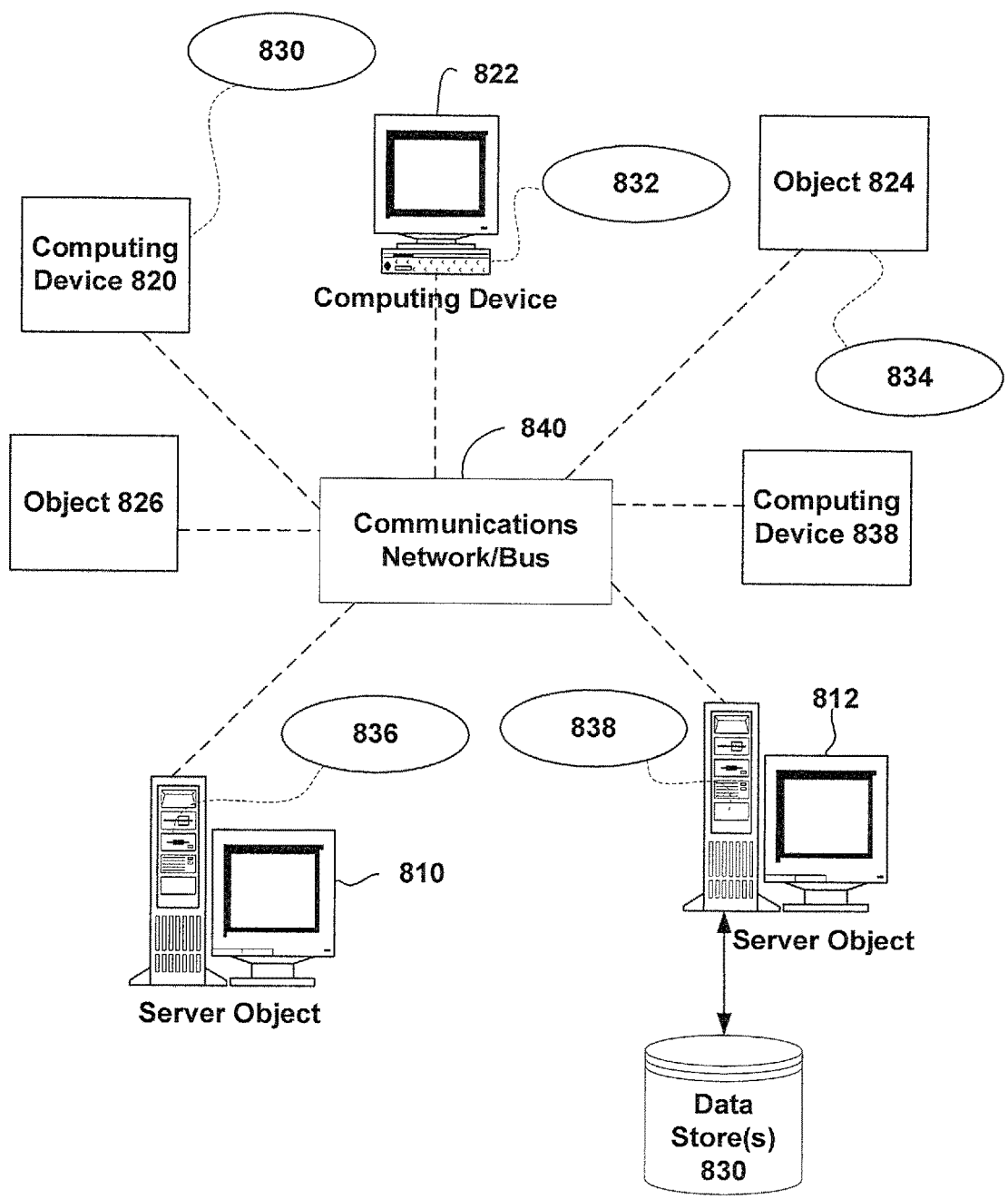
FIG. 8 is a block diagram representing an exemplary networked or distributed computing environment for implementing one or more embodiments described herein.

FIG. 8 provides a schematic diagram of an exemplary networked or distributed computing environment. The distributed computing environment includes computing objects 810, 812, etc. and computing objects or devices 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, digital music players, personal computers, laptops, tablets, etc., where embodiments of the inertia estimator described herein may reside on or interact with such devices.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 840 is the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Computing objects 810, 812, etc. may also serve as client computing objects or devices 820, 822, 824, 826, 828, etc., as may be characteristic of a distributed computing environment.

Exemplary Computing Device

Figure 9:
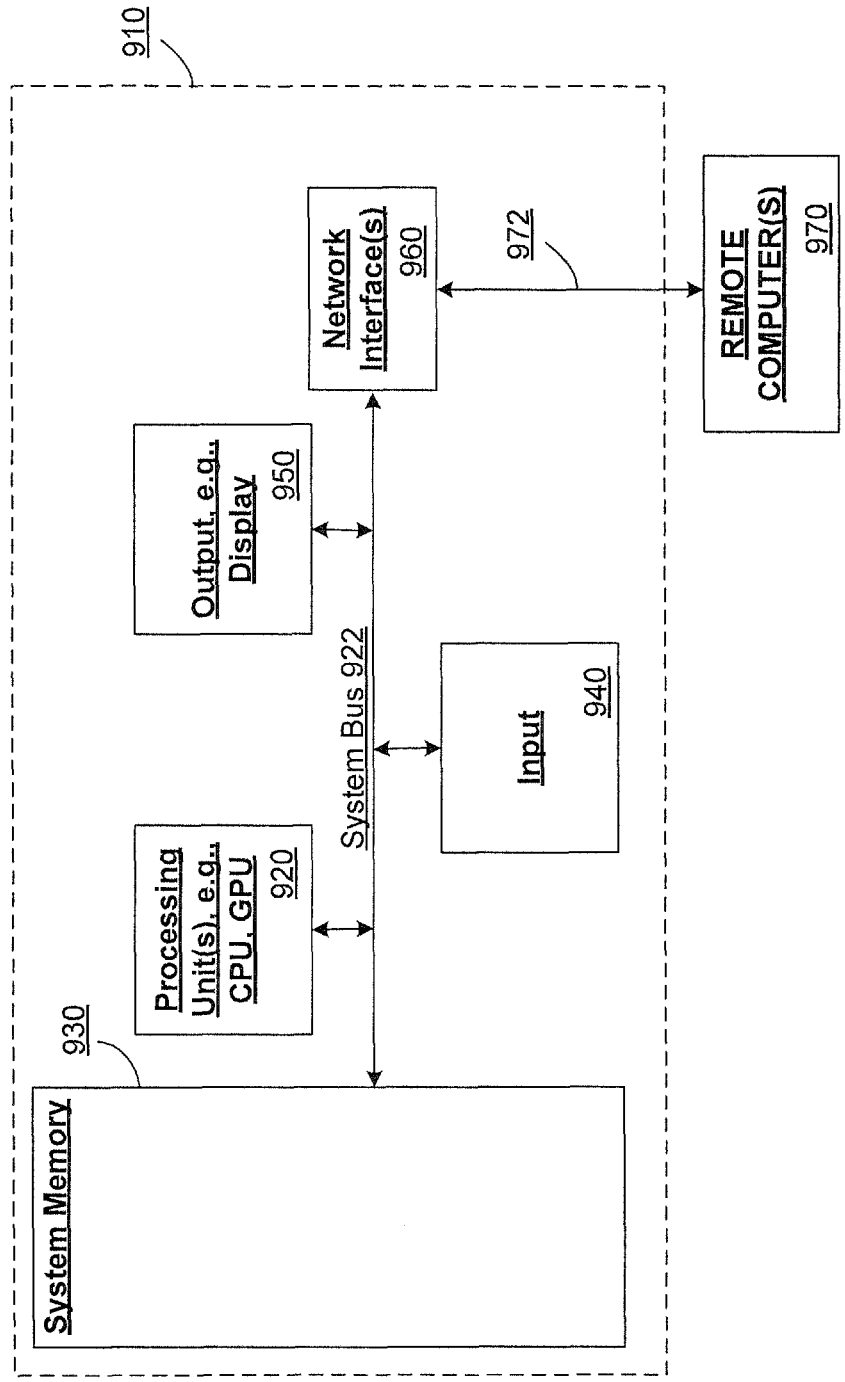
FIG. 9 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 9 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing system environment 900 be interpreted as having any dependency or requirement relating to any one or combination of components illustrated in the exemplary computing system environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950. In one or more embodiments, input devices 940 can provide user input to user interface 350, while output interface 950 can correspond to user interface 350.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein, components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

In view of the exemplary systems described above, methodologies that may be implemented in accordance with the described subject matter will be better appreciated with reference to the flowcharts of the various figures (e.g., FIG. 3). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method for commissioning a motor control system, comprising:

rendering, by a system comprising a processor, a first set of graphics representing application domains, wherein the application domains represent fields of industry, and the first set of graphics are rendered on a first interface display;

receiving, by the system, application domain selection information via interaction with the first interface display, the application domain selection information identifying an application domain of the application domains;

receiving, by the system via interaction with a second interface display, target information identifying a motor to be controlled by the motor control system;

retrieving, by the system from an application library, a sample motor control program selected based on the application domain selection information and the target information;

in response to receipt of a start command via interaction with the second interface display or another interface display, performing, by the system, an automatic adaptation step for the motor control system using the sample motor control program, wherein the performing the automatic adaptation step comprises:

sending control signals to the motor control system that transition the motor through a test sequence, the test sequence selected based on the target information and the application domain selection information, measuring, during the test sequence, one or more characteristics of the motor, the one or more characteristics comprising at least one of a resistance of a motor, an inductance of the motor, or a flux of the motor, and updating the motor control program based on the one or more characteristics to yield an adapted motor control program;

in response to receipt, via interaction with a third interface display, of a parameter value and a second start command, performing, by the system, a confirmatory operation step that confirms operation of the motor using the adapted motor control program; and transferring, by the system, the adapted motor control program to a motor controller of the motion control system to cause the motor controller to control the motor in accordance with the adapted motor control program.

2. The method of claim 1, wherein the receiving the target information comprises receiving target information identifying, as the motor, a three-phase alternating current (AC) induction motor.

3. The method of claim 1, wherein the receiving the application domain selection information comprises receiving application domain selection information that identifies, as the field of industry, at least one of a marine application, a crane application, a wastewater application, a conveyor application, a heating ventilation and air conditioning (HVAC) application, or an appliance application.

4. The method of claim 1, wherein the performing the automatic adaptation step comprises performing the automatic adaptation step using the application domain selection information and the target information as sole user-provided parameters.

5. The method of claim 1, wherein the rendering the first set of graphics comprises rendering a set of tile icons representing the application domains.

6. The method of claim 1, further comprising:
receiving, by the system via interaction with data input fields of a fourth interface display, one or more motor optimization parameter values, wherein the data input fields are presented based on at least one of the target information or the application domain selection information; and
updating, by the system, the adapted motor control program based on the one or more optimization parameter values.

7. The method of claim 1, wherein the parameter value is a target speed of the motor.

8. The method of claim 1, wherein
the performing the confirmatory operation step comprises rendering measured feedback information on the third interface display or another interface display, and
the feedback information is received from the motor controller.

9. The method of claim 8, wherein the rendering the measured feedback comprises rendering the measured feedback as at least one of a numeric value or a time-series graph.

10. A system for commissioning a motor control system, comprising:
a memory;
a processor configured to execute components stored on the memory, the components comprising:
a graphical interface component configured to render a set of interface displays and to receive, via interaction with the set of interface displays, application domain selection information identifying an application domain of the motor control system and target information identifying a motor to be controlled by the motor control system, wherein the application domain represents a field of industry;

a software wizard component configured to:
retrieve a sample motor control program from an application library based on the application domain selection information and the target information,
in response to receipt of a first start command received via interaction with the set of interface displays, send control signals to the motor control system that transition the motor through a test sequence selected based on the target information and the application domain selection information,
measure, during the test sequence, one or more characteristics of the motor, the one or more characteristics comprising at least one of a resistance of a motor, an inductance of the motor, or a flux of the motor,
update the sample motor control application using the one or more characteristics of the motor obtained via the test sequence to yield an adapted motor control program,
in response to receipt of a parameter value and a second start command via interaction with the set of interface displays, perform a confirmation operation that confirms operation of the motor using the adapted motor control program; and
a motion control interface configured to transfer the adapted motor control program to a motor controller of the motion control system to cause the motor controller to control the motor in accordance with the adapted motor control program.

11. The system of claim 10, wherein the motor is a three-phase alternating current (AC) motor.

12. The system of claim 10, wherein the application domain is at least one of a marine application, a crane application, a wastewater application, a conveyor application, a heating ventilation and air conditioning (HVAC) application, or an appliance application.

13. The system of claim 10, wherein the software wizard component is further configured to perform the test sequence using the application domain selection information and the target information as sole user-provided inputs.

14. The system of claim 10, wherein the graphical interface component is further configured to display, via one or more of the set of interface displays, prompts for receipt of one or more motor optimization parameter values, wherein prompts are selected based on at least one of the target information or the application domain selection information, and
wherein the software wizard component is further configured to update the adapted motor control program based on the one or more optimization parameter values.

15. The system of claim 10, wherein the parameter value is a target speed of the motor.

16. The system of claim 10, wherein the graphical interface component is further configured to render measured feedback information on at least one of the set of interface displays, the feedback information received from the motor.

17. A non-transitory computer-readable medium having stored thereon instructions that, in response to execution, cause a computer system to perform operations, comprising:
rendering a first interface display containing a first set of graphics representing application domains, wherein the application domains represent respective fields of industry;
receiving application domain selection information via interaction with the first interface display, the application domain selection information identifying an application domain of the application domains;
receiving via interaction with a second interface display, target information specifying a motor to be controlled in a motor control system;
selecting, from an application library, a sample motor control program based on the application domain selection information and the target information;
in response to receipt of a start command via interaction with the second interface display or another interface display, performing an automatic adaptation operation for the motor control system using the sample motor control program, the automatic adaptation operation comprising:
sending control signals to the motor control system that transition the motor through a test sequence, the test sequence selected based on the target information and the application domain selection information,
measuring, during the test sequence, one or more characteristics of the motor, the one or more characteristics comprising at least one of a resistance of a motor, an inductance of the motor, or a flux of the motor, and
updating the motor control program based on the one or more characteristics of the motor obtained by the automatic adaptation operation to yield an adapted motor control program;
in response to receipt, via interaction with a third interface display, of a parameter value and a second start command, performing a confirmatory operation step that confirms operation of the motor using the adapted motor control program; and
transferring the adapted motor control program to a motor controller of the motion control system to cause the motor controller to control the motor in accordance with the adapted motor control program.

18. The non-transitory computer-readable medium of claim 17, wherein the application domain selection information identifies, as a field of industry of the respective fields of industry, at least one of a marine application, a crane application, a wastewater application, a conveyor application, a heating ventilation and air conditioning (HVAC) application, or a home appliance application.

19. The non-transitory computer-readable medium of claim 17, wherein the performing the automatic adaptation operation comprises performing the automatic adaptation operation using the application domain selection information and the target information as sole user-provided parameters.

20. The non-transitory computer-readable medium of claim 17, wherein the operations further comprise:
receiving, via interaction with data input fields of a fourth interface display, one or more motor optimization parameter values, wherein the data input fields are presented based on at least one of the target information or the application domain selection information; and
updating the adapted motor control program based on the one or more optimization parameter values.

* * * * *